July 5, 1960  V. BERARDI ET AL  2,943,919
DEVICE FOR DETECTING COMBUSTIBLE GAS
Filed Jan. 16, 1957  2 Sheets-Sheet 2

INVENTORS
Vincenzo Berardi
Giovanni Manzani
BY
Beamon & Patch

United States Patent Office 2,943,919
Patented July 5, 1960

2,943,919

DEVICE FOR DETECTING COMBUSTIBLE GAS

Vincenzo Berardi, 46, Via Piave, Terlizzi, Italy, and Giovanni Manzari, 2, Via Tufaro, Valenzano, Italy Filed Jan. 16, 1957, Ser. No. 634,574

Claims priority, application Italy Jan. 20, 1956

3 Claims. (Cl. 23—255)

The present invention relates to a safety device for detecting gas escapes, said device being suitable to perceive the presence of gaseous fuel in closed places.

Several devices have been hitherto provided to detect escapes of unburnt gas from conduits or burners, said devices generally comprising mechanical means directly fitted on the burners or on the gas supplying conduits. With these devices, the mechanical parts of said devices, being directly in contact with the gas, may easily get obstructed, causing inconsistent operation.

On the contrary, the present invention is based on the method of taking, at determinated intervals (from a few seconds up to one hour or more, according to the need), samples of air from the place where the device is fitted, and of contacting said samples with an igniting device in such a way that, if a minimum proportion of unburnt gas is mixed with air, the mixture is ignited and actuates various alarm devices, such as optic (glow-lamps) and acoustic (bells) devices, closing in the meantime the gas supplying conduit (lighting gas or gas bottles).

The main object of the present invention is to perceive the presence of gas mixed with air, when the proportion of gas in the place is still not dangerous for humans.

Another object of the present invention is to adjust at will the interval between two operations of taking samples of air.

A further object of the present invention is to provide a device for these purposes having low operating expenses, since the whole device takes an amount of electric power of a few watts, even if the operation occurs in and about continuous manner, or also less.

Other objects and advantages of the present invention will become apparent from the following description of an embodiment thereof, when taken in connection with the accompanying drawings, in which.

Figure 1:
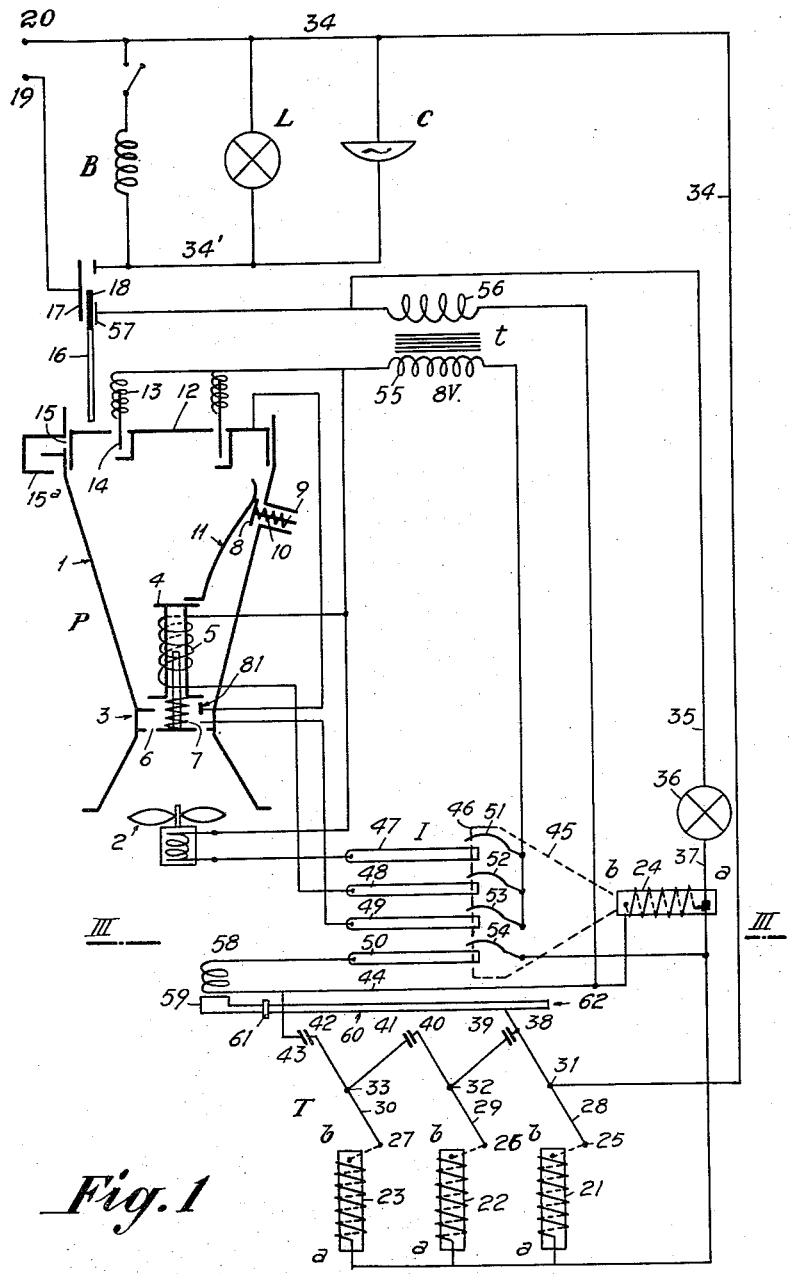
Figure 1 is a diagram of the various parts of the device and the corresponding electric network.

Referring now to Figure 1, letter P is the device for taking samples of air from the place to be watched. This device mainly consists of a tubular container 1 substantially shaped as two cone frusta connected to each other by their minor bases, so as to form a shape somewhat like a Venturi tube. At the lower end of tube 1 there is fitted a fan 2, the vanes of which, being in the same plane of the lower aperture of tube 1, when rotating draw air or gas-air mixture in the said tube 1. A closure valve is fitted in the neck 3 of tube 1. This valve consists of a hollow solenoid 4 that, when energized, is moved downwardly for the magnetic pull on an inner pin 5 fixed to the neck 3 by metal bars 6, against the stress of a spring 7. A second valve 8 is fitted in an aperture 9 provided in the upper side wall of tube 1. Valve 8 is held open by a spring 10, but is closed by an elastic arm 11, operatively connected to the solenoid valve 4, when said solenoid 4 moves downwardly to close the lower aperture of tube 1. The upper aperture of tube 1 is closed by a plunger cover 12 which may be reciprocated in the cylindrical upper part of tube 1, said plunger 12 being air-tight with the walls of tube 1. Plunger 12 is represented in Figure 1 in its lower position. Said plunger supports one or two known sparking devices or spark-plugs 13 which produce sparks at the tip of a movable rod 14 when the solenoid of spark-plugs 13 is energized.

Through the switching device I which will be hereinafter described, a low voltage current (e.g. 8 volts) is successively supplied to the circuit of fan 2, valve 4 and spark-plugs 13. Fan 2 forces air into tube 1, that enters through valve 4 and goes through valve 9. Successively, the current in the circuit of valve 4 closes valve 4 and consequently valve 9. Soon after, the current led in the circuit of spark-plugs 13 produces sparks in the interior of tube 1. If the air within tube 1 does not contain gas, nothing else will happen. On the contrary, if there is a gas-air mixture present in the atmosphere being tested, the gas air-mixture is ignited and while expanding pushes plunger 12 upwardly, then comes out from the bore 15 provided in the wall of tube 1, said bore 15 being exposed by plunger 12 during its upward movement. In order to prevent flames from coming out from said bore 15 and igniting the surrounding atmosphere, the bore 15 is provided with a labyrinth discharge pipe 15a through which the combustion gases eventually pass. This movement of plunger 12 causes also the displacement of a rod 16 of a switch 17. Thus the rod 16 with its movement and with its tip 18 made of conducting material breaks the current passage in the circuits I and T which will be hereinafter described, and closes another circuit between terminals 19 and 20 of the feeding network, as to actuate several alarm devices either acoustic (bells C) or optic devices (glow-lamps L). Similarly there is actuated a locking device B mounted on the gas supplying pipe or on the outlet of a gas bottle (before the reducer). Said locking device B will be hereinafter described.

When the alarm has been raised and the causes of the presence of gas have been identified and removed, the rod 16 and the plunger 12 are returned to their original position by lowering the rod 16, and also the plunger 12 by hand or other means.

Figure 2:
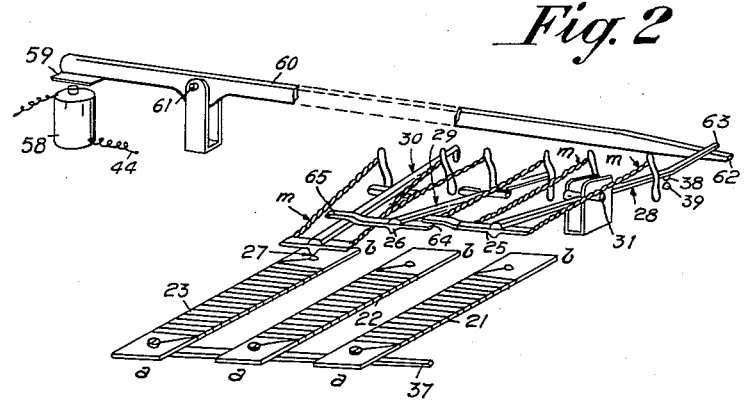
Figure 2 is a perspective view of a portion of the timing device T of Figure 1.
Figure 3:
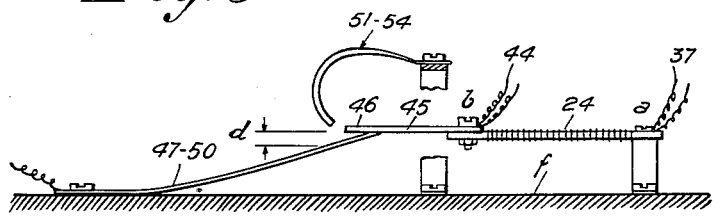
Figure 3 is a diagrammatic sectional view of the switching device I, taken on the line III—III of Figure 1.

Reverting now to the timing device T which, through the switching device I, actuates the device P for taking air samples at determined intervals, it mainly consists of a set of the so-called bimetallic elements (said elements being four in the embodiment shown in the drawings) 21, 22, 23 and 24, respectively (see Figures 1, 2 and 3). These bimetallic elements are formed by two blades of two different metals connected to each other and have the well known property of bending if subjected to heating. In the embodiment shown in the drawings the bimetallic elements are heated by electric resistances which are wound to said elements and being fixed to their end $a$ raise their end $b$, in consequence of the passage of current, within a determined time that depends on the sizes of the bimetallic elements, on the wire employed for the resistance and on the electric current flowing therethrough. On the ends $b$ of bimetallic elements 21, 22, and 23, rest the ends 25, 26 and 27, respectively, of switching beams 28, 29 and 30, respectively, which, when rotating round pivots 31, 32 and 33, respectively, may take two different positions, in consequence of holding springs m (see Figure 2), fitted as to urge the ends 25, 26 and 27 upwardly and downwardly according to the position of the said beams. Terminal 20 of the feeding network is connected by lead 34 with pivot 31 of beam 28. Terminal 19 is connected, through the common contact of switch 17, tip 18 of rod 16 and lead 35, to a glow-lamp 36 that operates as a protecting and stabilizing device and is of adjustable power, as to co-operate with the control of the duration of the desired intervals. Another lead 37 connects glow-lamp 36 with the ends a of the bimetallic elements 21, 22, 23 and 24.

The timing device T operates as follows: at the starting position, the ends 25, 26 and 27 of the beams 28, 29 and 30, respectively, are contacted with the ends b of the bimetallic elements 21, 22 and 23, respectively. The circuit is originally closed through the bimetallic elements 21; in consequence of the current passage, said element 21 heats up and its end b rises and causes the beam 28 to swing around pivot 31 as long as it springs in the position where the end 25 is raised and the other end 38 rests on contact 39 that is connected with pivot 32 of beam 29. At this moment the circuit passes through the bimetallic element 22, thus the electric current heats the same and causes its end b to rise; said end b urges upwardly the end 26 of beam 29 and causes said beam 29 to spring on the position where the end 26 is raised and the end 40 touches contact 41 connected to the pivot 33 of beam 30. Now, the current raises the end b of the bimetallic element 23, thus the end 27 of beam 30, the end 42 of which makes contact with terminal 43 connected through lead 44 with the end b of the bimetallic element 24. The electric current heats said element 24 so that its end b rises and actuates switch I, as it will be hereinafter set forth.

In Figure 2 there are shown the beams 28 and 29 with their ends 25 and 26, respectively, in the raised position, while beam 30 rests with its end 27 on the end b of the bimetallic element 23. In order to make the drawing clear, the supports of pivots 32 and 33 (see Figure 1) as well as several electric connections are omitted.

Referring now to Figures 1 and 3, on the end b of the bimetallic element 24 there is fixed a substantially triangularly shaped plate 45, the edge 46 of which (opposite to end b) urges the ends of four resilient metal blades 47, 48, 49 and 50 downwardly, each of them being fixed with the other end to the bottom f of the apparatus. When the current flows through the bimetallic element 24, the end b of the same rises and causes the plate 45 to rise; the edge 46 of said plate 45, during the rising movement, causes the blades 47, 48, 49 and 50 to touch, in succession and at determined intervals, the bow-shaped contacts 51, 52, 53 and 54, respectively. The interval (relatively short, viz. few seconds) between two actions of contacting is suitably controlled by varying the gap d between the blades 47, 48, 49 and 50 and the contacts 51, 52, 53 and 54 respectively. The contacts 51, 52 and 53 are inserted into the low-voltage feeding circuits of fan 2, valve 4 and spark-plugs 13, which are parts of the device P for taking samples of air, hereinbefore described. The current of these circuits comes from the secondary 55 of a transformer t the primary winding 56 of which is connected on a side to the terminal 57 of switch 17 and on the other side to the lead 44 of the timing device T. Then the current flows in transformer t only when the rod 16 of switch 17 is in its usual position, viz. when plunger 12 of the device P is lowered and the current flows also through the bimetallic element 24, that is to say in the last stage of the interval between two successive operations of taking samples of air (or air-gas mixture).

The contact 54 is inserted in a circuit of the device for bringing back to the original position the beams 28, 29 and 30. This circuit comprises a solenoid 58 which, when energized, actuates a conducting blade 59 fixed at one of the ends of a insulating lever 60 that is allowed to swing round a pivot 61. Thus the end 62 of the lever 60 is raised and urges upwardly the end 63 of the beam 28 that takes its starting position, i.e. the end 25 of beam 28 is again contacted with the end b of the element 21, which in the meantime cooled down and took the starting horizontal position. The beam 28, by means of the projection 64 of its end 25, draws also the beam 29 that in its turn, by means of the projection 65 of its end 26, draws the beam 30 in its starting position. Thus the switching device I closes by turns the circuits so that the following steps occur in succession: operation of the fan, with consequent movement of air from the outside to the interior of tube 1, closing of valve 4 and valve 8, the sample of air is imprisoned in the tube 1; production of sparks from the spark-plugs 13. At this point, if there is no ignition of mixture, the contact 54—50 is closed; solenoid 58 energizes blade 59 and causes lever 60 to rotate around pivot 61; the end 62 of lever 60 rises and causes the beam 28 and accordingly beams 29 and 30 to swing back to their starting position. Thus the flow of current into lead 44 and in the primary winding 56 of transformer t is interrupted and the cycle will begin again with the passage of current through the bimetallic element 21.

Figure 4:
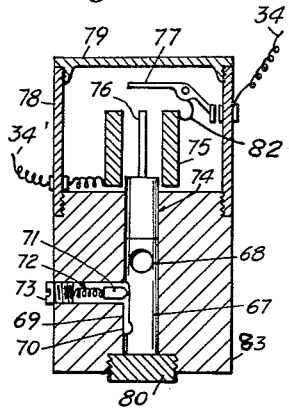
Figure 4 is a detailed view of the locking device B of Figure 1.
Figure 5:
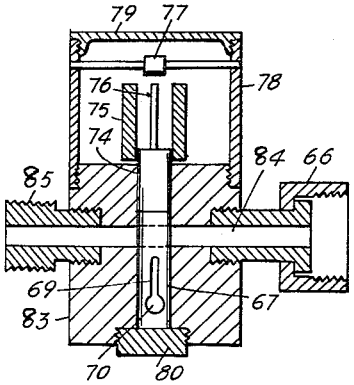
Figure 5 is a cross-sectional view of the same device B taken on a line at right angles with the plane of Figure 4.

In case of ignition of mixture in the chamber formed by tube 1, the plunger 12 and rod 16 of switch 17 rise and the tip 18 of rod 16 breaks off the flow of current into the lead 35 (viz. in the devices P, T and I) and closes the circuits of the alarm devices C and L and of the locking device B. This latter device, represented in two sections at right angles with each other in Figures 4 and 5, respectively, consists of a main cylindrical body 83 crossed by a horizontal bore 84 that is inserted by means of two connections 85 and 66 in the gas supplying pipe, preferably in the main inlet thereof. The cylindrical body, 83 is also provided with a central vertical bore, in which slides a cylindrical plunger 67 that has in its central portion a bore 68 which aligns, in normal operative condition, with the bore 84 so as to allow the passage of gas. On one side of plunger 67 there is provided a control groove 69 that has a cavity 70 at its lower end. In the groove 69 a pin 71 slides, said pin 71 being urged against the groove 69 by a spring 72 in a suitable seat, said spring 72 being held in position by a screw 73 screwed in the cylindrical body 83. The upper part 74 of plunger 67 is made of magnetic material and forms the sliding core of an electromagnet 75. A vertical rod 76 made of insulating material is fitted in a central position on the core 74 in such a way that, when the core 74 moves upwardly, said rod 76 opens a switch 77 fixed to a cylindrical wall 78 screwed on the body 83. A circular cap 79 is in its turn screwed on the cylindrical wall 78 and closes the upper part of the device. On the bottom of the cylindrical body 83 a cap 80 is screwed for inspecting and cleaning purposes. The operation of the locking valve B now described is as follows: when the current is energized in the alarm circuit 34, 34′ through switch 17 (see Figure 1), the magnet 75 attracts and raises the core 74; the bore 68 moves upwardly and breaks the flow of gas through the horizontal bore 84. The plunger 67 is controlled during its movement by the pin 71 that enters the groove 69 and successively the cavity 70 as to prevent the plunger 67 from returning downwardly. The plunger 67, by means of the rod 76, at the upper end of its stroke opens the switch 77 which breaks the circuit 34, 34′ preventing the coil of magnet 75 burning out.

When all the provisions necessary for preventing unburnt gas escapes have been taken, the device B is set again in operative position by unscrewing the screw 73 as to cause the pin 71 to come out from the cavity 70, so that the plunger 67 may be again moved downwardly to its starting position. When the cap 79 has also been unscrewed, the plunger 67 and the switch 77 are set back in operative position and the device is again ready for operation. The operation of setting back the locking device B is not made automatic in order to compel the user to call a person skilled in the art for taking the required precautions.

By way of example only, now there are given some modifications in the hereinbefore described embodiment. Thus, the number and the kind of the bimetallic elements may be varied for changing the interval between two operations of taking samples of air, or for the same purpose the number and the kind of the "flywheel" lamps 36 may be varied as well as other alarm and locking devices may be inserted in the alarm circuit, and so forth.

Thus, e.g. for avoiding gas escapes in various rooms or places not directly controlled by the apparatus, air inlets may be provided, formed by conduits departing from the Venturi tube 1 and provided with entrance openings and suction fans which operate in time with fan 2 of the main device.

Although this invention has been described in its preferred form with a certain degree of particularity enabling others to reproduce the invention, it is understood that the present disclosure has been made by way of example and that numerous modifications and changes in the details and in the various devices may be resorted to without departing from the spirit and scope of the invention as defined in the claims which are made a part hereof.

What we claim is:

1. In a self operating safety device for testing for the presence of combustible gas for use in conjunction with a gas supply line having an electrically operated flow valve, a compression chamber having inlet and outlet ports, an expandable member comprising a portion of said chamber, electrically operated simultaneously actuated closure means associated with said ports, an electrically driven fan for filling said chamber with the atmosphere to be tested, electrical gas ignition means within said chamber, first switch means sequentially activating said fan, closing said closure means and activating said ignition means, timing means operating said first switch means at pre-determined intervals, second switch means operably connected to said expandable member adapted to close the flow valve and render said first switch means inoperative upon an explosion occurring within said chamber.

2. In a self operating safety device as in claim 1 wherein said timing device includes a plurality of bi-metal elements, a heater associated with each of said bi-metal elements and switch means sequentially operated by said elements for successively energizing said heaters.

3. In a self operating safety device as in claim 2 wherein said bi-metal elements comprise first, second and third elements and third, fourth and fifth switches are operatively associated with said elements, respectively, whereby movement of said first element operates said third switch to energize the heater of said second element, movement of said second element operates said fourth switch to energize the heater of said third element and movement of said third element operates said fifth switch to activate said first switch means.

References Cited in the file of this patent

UNITED STATES PATENTS

| | | |
|---|---|---|
| 1,977,481 | Jones | Oct. 16, 1934 |
| 2,170,056 | Keinath et al. | Aug. 22, 1939 |
| 2,508,588 | Waltman | May 23, 1950 |
| 2,581,812 | Page | Jan. 8, 1952 |

FOREIGN PATENTS

| | | |
|---|---|---|
| 19,008 | Great Britain | 1910 |
| 693,565 | Great Britain | July 1, 1953 |